United States Patent [19]

Werner

[11] Patent Number: 5,681,395
[45] Date of Patent: Oct. 28, 1997

[54] METHOD FOR THE REMOVAL OF A SURFACE LAYER BY A LASER BEAM

[75] Inventor: Linus Werner, Neuss, Germany

[73] Assignee: Urenco Deutschland GmbH, Jülich, Germany

[21] Appl. No.: 642,902

[22] Filed: May 6, 1996

Related U.S. Application Data

[63] Continuation-in-part of PCT/EP95/00503 Feb. 13, 1995.

[30]   Foreign Application Priority Data

Mar. 26, 1994 [DE] Germany ............................ 44 10 613.0

[51] Int. Cl.⁶ ............................ B08B 7/00; B23K 26/06
[52] U.S. Cl. ........................ 134/1; 219/121.69; 219/121.8
[58] Field of Search ...................... 134/1; 219/121.69, 219/121.73, 121.8

[56]   References Cited

U.S. PATENT DOCUMENTS

| | | | |
|---|---|---|---|
| 4,654,115 | 3/1987 | Egitto et al. ........................ | 134/1 X |
| 4,756,765 | 7/1988 | Woodroffe ........................ | 134/1 |
| 5,151,135 | 9/1992 | Magee et al. ........................ | 134/1 |
| 5,328,517 | 7/1994 | Cates et al. ........................ | 134/1 |
| 5,418,349 | 5/1995 | Swain et al. ........................ | 134/1 |
| 5,491,319 | 2/1996 | Economikos et al. ............ | 219/121.69 |
| 5,562,840 | 10/1996 | Swain et al. ........................ | 219/121.69 |
| 5,571,335 | 11/1996 | Lloyd ........................ | 134/1 |

*Primary Examiner*—Robert J. Warden
*Assistant Examiner*—Saeed Chaudhry
*Attorney, Agent, or Firm*—Klaus J. Bach

[57]   ABSTRACT

In a method for uniformly removing layers from a coated surface, a laser beam is used for scanning the surface along parallel scanning lines wherein the laser beam has a surface illuminating cross-section with a central area defined between parallel lines extending transverse to the scanning lines and tapered marginal end areas extending from the transverse opposite ends of the central area to a predetermined distance and the scanning line distance is so selected that the central areas of the surface illuminating cross-sections of adjacent scanning lines are spaced by the predetermined distance and the tapered marginal end areas of the beam overlap between the scanning lines and together provide, in the overlap area, for essentially the same laser beam exposure as in the central area.

3 Claims, 2 Drawing Sheets

METHOD FOR THE REMOVAL OF A SURFACE LAYER BY A LASER BEAM

This is a continuation-in-part application of International patent application PCT/EP95/00503 filed Feb. 13, 1995 and claiming priority of the German application P 44 10 613 of Mar. 23, 1994.

BACKGROUND OF THE INVENTION

The invention resides in a method for the uniform removal of one or several layers from a coated surface by means of a pulsed laser beam which, shaped by a beam former, illuminates an area of predetermined cross-section in such a way that every surface unit is exposed to the same number of laser pulses.

From the publication "Industrial Laser Review", August 1991, pages 7 to 9, it is known for the removal of paint layers form an aluminum or composite material surface by means of a laser beam to utilize a scanning field template whose field elements correspond to the cross-section of a laser beam. In that case, adjacent templates are overlapping and the overlapping areas are over-exposed.

U.S. Pat. No. 4,756,765 discloses a procedure wherein the coated surface is linearly scanned by a pulsed laser beam and the cross-section of a laser pulse when impinging on the surface is in the form of a square.

For the uniform removal of various paint layers, it is important that each element of the surface to be treated is subjected to the same number of laser pulses. However, when changing from one line to the next, operational tolerances cause marginal areas between two adjacent lines where this condition is not fulfilled. If the line spacing is excessive, a marginal strip remains unexposed; if the line spacing is insufficient, a marginal strip will receive twice the number of laser pulses.

It is the object of the present invention to provide a method for the uniform removal of surface layers wherein, inspite of the aforementioned tolerances with respect to the line positioning of the movable laser system, no over- or underexposed marginal areas between two adjacent lines are present.

SUMMARY OF THE INVENTION

In a method for uniformly removing layers from a coated surface a laser beam is used for scanning the surface along parallel scanning lines wherein the laser beam has a surface illuminating cross-section with a central area defined between parallel lines extending transverse to the scanning lines and tapered marginal end areas extending from the transverse opposite ends of the central area to a predetermined distance and the scanning line distance is so selected that the central areas of the surface illuminating cross-sections of adjacent scanning lines are spaced by the predetermined distance and the tapered marginal end areas of the beam overlap between the scanning lines and together provide, in the overlap area, for essentially the same laser beam exposure as in the central area.

With this method, the number of pulses per surface unit decreases toward the periphery in the marginal areas of a line which is scanned. If then, with a change of a line, the new line position is so selected that the outer end of the marginal area of the new line coincides with the boundary of the central area of the previous line wherein the number of pulses per surface unit also decrease from the boundary of the central zone outward to the outer end of the marginal zone, the twice scanned marginal area between the central zones of two adjacent lines is subjected to the same number of pulses as the central zones. Tolerance variations of the line positioning leads only to negligible errors, but not to unexposed or double exposed strips.

DESCRIPTION OF A PREFERRED EMBODIMENT

Figure 1:
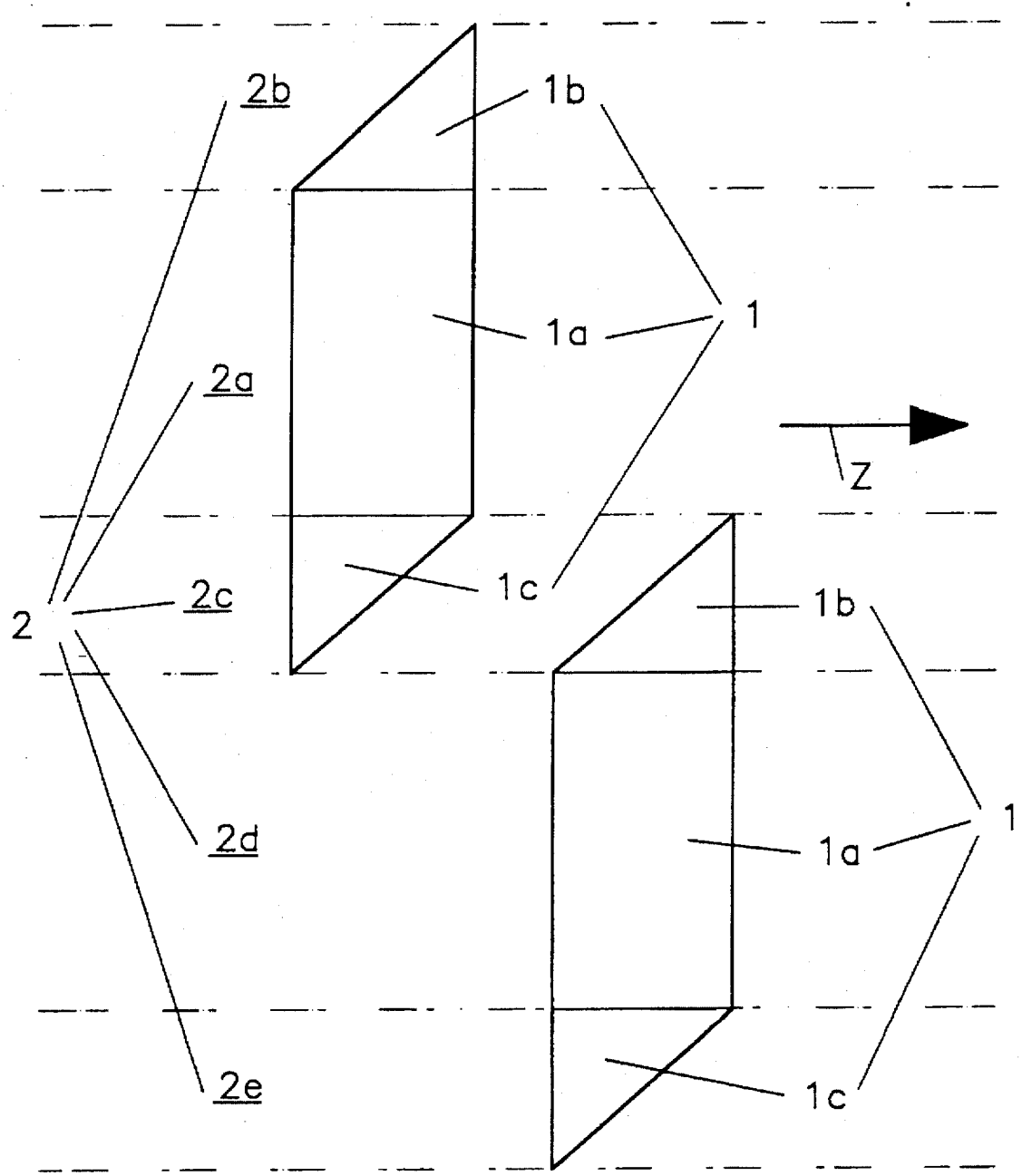
FIG. 1 shows a surface section exposed to laser pulses.

FIG. 1 shows a surface section 1 of a surface 2, the surface section 1 being provided for, and illuminated by, a shaped pulsed laser beam.

The section 1 is scanned by the laser beam in the direction of the line advance Z by means of a deflection arrangement for the laser system (not shown). In this procedure, the number of laser pulses per surface unit should be the same for each line.

The section 1 comprises a central area 1a and two opposite marginal areas 1b and 1c. The central area has the shape of a quadrilateral whose long sides extend perpendicularly to the direction of the line advance Z. The marginal areas 1b and 1c extending from the central area 1a in a direction normal to the direction of the line advance Z each form a right-angled triangle having an outer apex disposed on the periphery of the marginal areas 1b, 1c. The two triangles combined have a total surface of a width corresponding to that of the central area 1a as measured in the direction of the line advance Z.

In this manner, with a non-uniform laser pulse scanning the surface in the direction of the line advance, a scanning pattern is obtained wherein the number of laser pulses per surface unit linearly decreases outwardly from the central zone 2a toward the periphery of the marginal zones 2b, 2c.

The line distance is so selected that the two marginal areas overlap as fully as possible. Then the marginal area 2c is scanned a second time when the next line is scanned but with reversed intensity variation with regard to the number of laser pulses per surface unit.

As a result, the marginal areas 2b, 2c, 2e are subjected to the same number of laser pulses per surface unit as the central areas 2a, 2d of each line of the surface 2 being scanned so that uniform removal of one or several paint layers from a painted surface for example is achieved.

Figure 2:
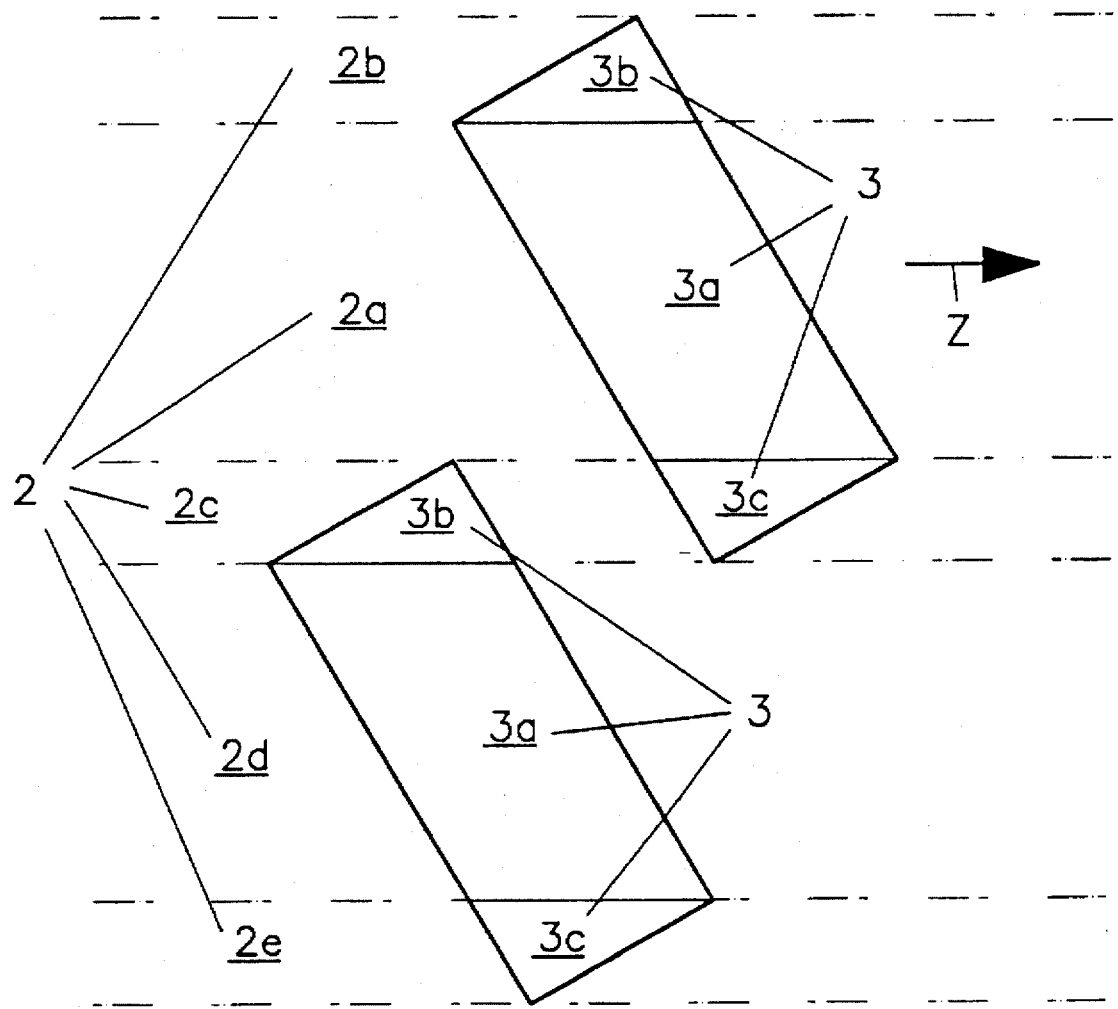
FIG. 2 shows a variation of the arrangement of FIG. 1.

FIG. 2 shows a variation of the scanning example given in FIG. 1.

In this case, the section 3 has the shape of a quadrilateral which, however, is inclined with respect to the direction Z of the line advancement. As a result, the central scanning area is formed by a parallelogram 3a and the scanning zones for the marginal areas 2b, 2c, 2e are again defined by right angled triangles 3b and 3c again resulting in the exposure of the scanning surface to the same number of laser beam pulses per surface unit.

What is claimed is:

1. A method for uniformly removing individual or several layers from a coated surface using a pulsed laser, said method comprising the steps of: providing a laser beam for scanning said coated surface along parallel scanning lines, said laser beam having a surface illuminating cross-section with a central area of a given width defined between parallel lines extending transverse to said scanning lines and tapered marginal end areas extending in opposite transverse directions from said central area to a predetermined distance, and scanning said surface with a line distance such that the central areas of the surface illuminating cross-sections of said laser beam of adjacent lines are spaced by said predetermined distance whereby said tapered marginal end areas between adjacent lines combined provide for essentially the same width as is provided for in said central area between said parallel lines.

2. A method according to claim 1, wherein said central area between said parallel lines has a shape of a quadrilateral and said tapered marginal end areas have a shape of triangles having a height given by said predetermined distance.

3. A method according to claim 1, wherein said central area between said parallel lines has a shape of a parallelogram and said tapered marginal end areas have a shape of triangles having a height corresponding to said predetermined distance.

* * * * *